No. 784,054.

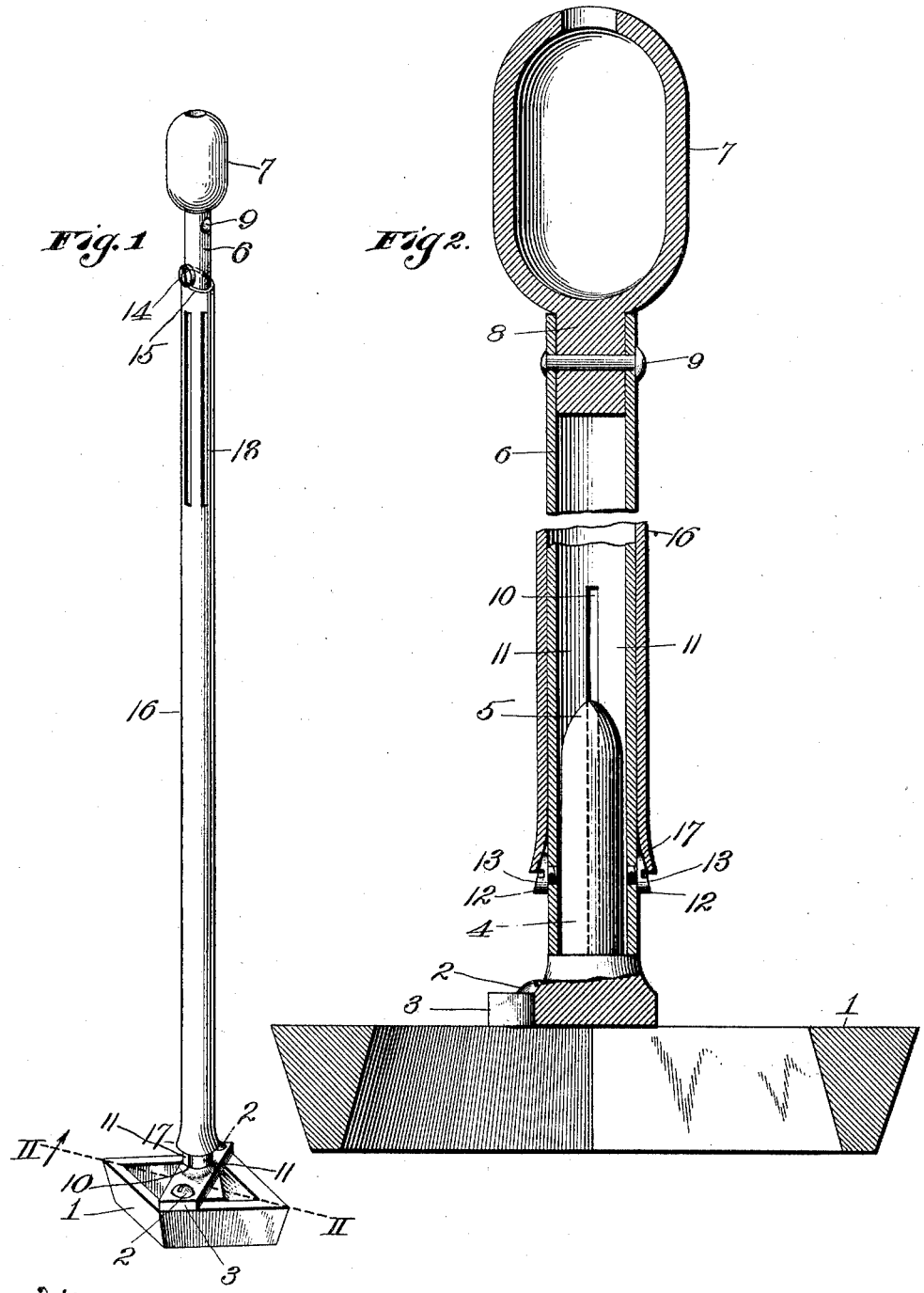

Patented March 7, 1905.

UNITED STATES PATENT OFFICE.

SAMUEL KLEINHAMMER, OF MARION COUNTY, KANSAS.

BRANDING-IRON.

SPECIFICATION forming part of Letters Patent No. 784,054, dated March 7, 1905.

Application filed August 29, 1904. Serial No. 222,549.

*To all whom it may concern:*

Be it known that I, SAMUEL KLEINHAMMER, a citizen of the United States, residing in the county of Marion, State of Kansas, have invented certain new and useful Improvements in Branding-Irons, of which the following is a specification.

This invention relates to branding-irons; and my object is to produce a device of this character by which the branding operation can be performed with celerity and efficiency and which is of simple, strong, durable, and cheap construction.

To this end the invention consists in certain novel and peculiar features of construction and combinations of parts, as hereinafter described and claimed, and in order that it may be fully understood reference is to be had to the accompanying drawings, in which—

Figure 1 represents a perspective view of a branding-iron embodying my invention. Fig. 2 is an enlarged section of the same, taken on the line II II of Fig. 1, said figure being broken away.

In the said drawings, 1 designates the branding element, the same being shown as of diamond shape, though of course it may be of any desired pattern. Secured to the rear face of said branding element by screw-bolts 2 or otherwise is a cross-bar 3, provided with a cylindrical stem 4, tapered at its upper end, as at 5, for a purpose which hereinafter appears.

The handle portion of the implement is constructed as follows: 6 designates a tube of suitable length, and 7 a knob therefor, said knob having a stem portion 8, fitting in tube 6 and secured therein by a rivet 9. The lower end of the tube, which is of spring metal, is split diametrically, as at 10, a distance exceeding the length of stem 4 by preference, so as to provide a pair of clamping-jaws 11 segmental in cross-section, so that when slipped upon stem 4 the latter shall be almost completely incased by said jaws. Near their lower ends and at diametrically opposite points said jaws are provided with screw-bolts 12, having their heads disposed at the outer side of the jaws and beveled upwardly and inwardly with respect thereto, as at 13. Secured to the tube near knob 7 is a bolt 14, adapted to travel up and down upon the cam-shaped end 15 of tubular casing 16, through which tube 6 extends, the lower end of casing 16 being flared, as at 17, sufficiently to receive the headed portions of screw-bolts 12 when jaws 11 are distended, and said casing near its upper end by preference is formed with external grooves 18 to provide a gripping-surface.

In the practical handling of the device at least two branding elements will be employed, so that one may be getting hot while the other is in use, and said element while being heated is preferably arranged with its stem 4 projecting upwardly. When it is desired to use the iron, screw 14 is in engagement with the lower portion of the cam end 15 of casing 16, and as a result tube 6 projects a sufficient distance beyond the flared end of the casing to permit jaws 11 to spring apart their full distance, and thus be capable of slipping freely upon the stem of the branding element when the operator desires to use the same, and in this connection it will be observed that the tapering end of the stem facilitates the engagement therewith of the tube 6. The operator after the tube 6 is slipped on the stem grasps tightly the roughened portion 18 with one hand and with the other upon the knob 7 twists the latter so as to cause the head or bolt 14 to ride upwardly on the cam-surface 15. This action relatively draws the jaw end of tube 6 farther into the casing and causes the heads of bolts 12 by pressure against the flaring end 17 of the casing to spring jaws 11 inward and clamp them tightly against stem 4, so that the branding element can be withdrawn from the fire or other heating medium and used for the purpose desired. When the temperature of the branding element has diminished to such an extent that it must be reheated for further service, it is replaced in the fire and the knob and casing twisted in the opposite direction from that described, so as to restore the parts to the position shown in Fig. 2, when the handle portion of the device is withdrawn from engagement with the stem 4.

From the above description it will be apparent that I have produced a branding-iron possessing the features of advantage enumerated as desirable in the statement of the object of the invention and which obviously is susceptible of changes in some particulars without departing from its spirit and scope or sacrificing any of its advantages.

Having thus described the invention, what I claim as new, and desire to secure by Letters Patent, is—

1. A branding-iron, comprising a branding element having a stem, a tube kerfed from its extreme lower end upward a suitable distance, and provided at the outer side of said kerfed portion with a head or boss tapering upwardly and inwardly, and having an external head or boss above said kerfed portion, and a tubular casing fitting snugly on the tube and having its lower end flared to receive the first-named head or boss and its upper end beveled for engagement with the lower side of the last-named head or boss.

2. A branding-iron, comprising a branding element having a stem, a tube provided with kerfs extending from its extreme lower end upwardly a suitable distance to produce a pair of oppositely-disposed integrally-formed spring-jaws, an upwardly and inwardly tapering head or boss at the outer side of each of said jaws, a head or boss at the outer side of said tube above said kerfed portion, and a tubular casing fitting snugly on the tube and having its lower end flared to receive the first-named heads or bosses and its upper end beveled for engagement with the lower side of the last-named head or boss.

3. A branding-iron, comprising a branding element having a stem, a tube having its lower end formed with spring-jaws to engage said stem, and provided with bolts having their heads disposed externally of the tube and beveled inwardly and upwardly thereof, and having near its upper end a bolt with its head disposed externally of the tube, and a tubular casing fitting on the tube and having its lower end flared to receive the first-named bolts of the tube and its upper end beveled for engagement with the lower side of the head of the upper bolt of the tube.

4. A branding-iron, comprising a branding element having a stem, a tube having its extreme lower end kerfed to produce a spring-jaw integral with the tube and provided at the outer side of said kerfed portion or jaw with a head or boss and above said kerfed portion with a second external head or boss, and a tubular casing fitting snugly on the tube and having its lower end flared to receive the first-named head or boss, and its upper end beveled to engage with the lower side of the last-named head or boss.

In testimony whereof I affix my signature in the presence of two witnesses.

SAMUEL KLEINHAMMER.

Witnesses:
H. C. RODGERS,
G. Y. THORPE.